(12) United States Patent
Gross et al.

(10) Patent No.: US 7,357,445 B2
(45) Date of Patent: Apr. 15, 2008

(54) ADAPTIVE CRASH STRUCTURE FOR A VEHICLE BODY OR CHASSIS OF A MOTOR VEHICLE

(75) Inventors: Walter Gross, Detmold (DE); Jens Stolle, Schloss Holte Stukenbrock (DE); Hans-Jürgen Neumann, Bielefeld (DE); Wolfgang Streubel, Detmold (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 22 days.

(21) Appl. No.: 11/467,761

(22) Filed: Aug. 28, 2006

(65) Prior Publication Data

US 2007/0114804 A1    May 24, 2007

(30) Foreign Application Priority Data

Aug. 29, 2005    (DE) ..................... 10 2005 041 021

(51) Int. Cl.
*B60R 19/34*    (2006.01)
(52) U.S. Cl. ................. 296/187.09; 293/133; 188/377
(58) Field of Classification Search ........... 296/187.08, 296/187.09; 293/132, 133; 188/377; 280/784, 280/781
See application file for complete search history.

(56) References Cited

U.S. PATENT DOCUMENTS 6,328,377 B1    12/2001    Makita et al.

7,070,217 B2 *    7/2006    Longo ..................... 293/132

FOREIGN PATENT DOCUMENTS

| DE | 196 25 295 A1 | 1/1997 |
|----|---------------|--------|
| DE | 103 31 862 A1 | 2/2005 |
| EP | 1 541 424 A   | 6/2005 |
| FR | 2 785 965 A1  | 5/2000 |
| JP | 11180235 A    | 7/1999 |

* cited by examiner

*Primary Examiner*—Joseph D Pape
(74) *Attorney, Agent, or Firm*—Henry M. Feiereisen; Ursula B. Day

(57) ABSTRACT

An adaptive crash structure of a vehicle body or chassis of a motor vehicle includes a first metal casting and a second metal casting. A deformation element in the form of a metal casting for absorbing energy interconnects and forms with the first and second metal castings a single piece construction through a casting process. The deformation element is comprised of a plurality of funnel-shaped wedge bodies which are disposed in succession, with neighboring wedge bodies being connected through intervention of a predetermined breaking web. Each wedge body is defined by a diameter, wherein the diameters of the wedge bodies are sized to allow the wedge bodies to move telescopically into one another when a limit stress is reached and the predetermined breaking webs rupture so as to effect a tight intergrip of the telescoping wedge bodies in a self-locking manner.

24 Claims, 3 Drawing Sheets

ADAPTIVE CRASH STRUCTURE FOR A VEHICLE BODY OR CHASSIS OF A MOTOR VEHICLE

CROSS-REFERENCES TO RELATED APPLICATIONS

This application claims the priority of German Patent Application, Serial No. 10 2005 041 021.9, filed Aug. 29, 2005, pursuant to 35 U.S.C. 119(a)-(d), the content of which is incorporated herein by reference.

BACKGROUND OF THE INVENTION

The present invention relates to an adaptive crash structure for a vehicle body or chassis of a motor vehicle.

Nothing in the following discussion of the state of the art is to be construed as an admission of prior art.

Heretofore, complex metal castings have been used in front or rear zones of a motor vehicle, in particular when crash structures and chassis parts are involved. Employing castings of aluminum, aluminum alloys or other suitable cast materials result in weight saving while still allowing realization of complex structures. In order to meet the demand for resilience in the event of impact, relatively thick-walled and rigid castings have been combined to date with thin-walled deformation members, for example through incorporation of an extrusion profile using a welding operation. The connection between castings and interposed deformation member is difficult to implement as several single parts have to be separately manufactured, handled, positioned, and welded together. The welding operation generates heat which causes parts to warp so that effective surfaces and boreholes require refinishing after assembly to stay within admissible tolerances. Still, such structures tend to warp even after machining and in addition require also special protection for transport.

It would therefore be desirable and advantageous to provide an improved adaptive crash structure which obviates prior art shortcomings and which is easy to manufacture while functioning reliably in the event of a crash.

SUMMARY OF THE INVENTION

According to one aspect of the present invention, an adaptive crash structure of a vehicle body or chassis of a motor vehicle includes a first metal casting, a second metal casting, a deformation element in the form of a metal casting for absorbing energy, with the deformation element interconnecting and formed in one piece with the first and second metal castings through a casting process, wherein the deformation element is comprised of a plurality of funnel-shaped wedge bodies disposed in succession, with neighboring wedge bodies being connected through intervention of a predetermined breaking web, wherein each wedge body is defined by a diameter, with the diameters of the wedge bodies sized to allow the wedge bodies to move telescopically into one another when a limit stress is reached and the predetermined breaking webs rupture so as to effect a tight intergrip of the telescoping wedge bodies in a self-locking manner.

The present invention resolves prior art shortcomings by constructing the deformation element in one piece with the metal castings. In other words, the structure of deformation element and metal castings can be made monolithically through a casting process in the absence of any welding process. As a result, the number of parts is significantly reduced. There is no need for a complicated separate manufacture, positioning, and of course a previously required jointing operation, i.e., welding. The absence of welding heat also means less warping of the structure. The deformation element of the invention is able to meet required crash standards as a consequence of the arrangement of sequentially disposed wedge bodies and the provision of a predetermined breaking web between neighboring wedge bodies. Once, a limit stress is encountered, the predetermined breaking webs rupture to allow the wedge bodies to move into one another, ultimately causing a clamping action and self-locking of the telescoping wedge bodies. In other words, once the predetermined breaking web rupture and the wedge bodies are clamped together, the first and second metal castings are securely and reliably interconnected. The funnel shape of the wedge bodies enables a self-centering of adjoining wedge bodies so that the metal castings, despite a change in their relative length, are able to assume a predetermined position also after a crash. The self-locking action between the clamped wedge bodies prevents inadvertent separation of the metal castings. Thus, the present invention results in an adaptive crash structure that can be manufactured in its entirety through a casting process at optimum weight and optimum crash behavior to convert crash energy into deformation energy.

The adaptive crash structure according to the invention exhibits its benefits in particular when extending in a length direction of the vehicle. In this case, the deformation element also extends in length direction of the vehicle and is thus able to resist and absorb to a certain degree in particular a frontal impact force. In the event of a crash, the deformation element shortens by a predetermined length while absorbing energy at the same time and especially retaining load-bearing capability following a crash.

According to another feature of the present invention, the deformation element may be disposed at an angle to the length direction of the vehicle. Suitably, the angle ranges between 45° and 135°, e.g. 90°. As a result, the deformation element can thus be applied also in the side zones of the vehicle that are subjected at a side impact.

Examples of parameters that are relevant in addition to material selection for the energy absorption of the deformation element include angle of slope, wall thickness, dimensioning of the predetermined breaking webs, and surface roughness and surface geometry.

According to another feature of the present invention, neighboring wedge bodies may have wall portions to come into contact with confronting surfaces which are defined by angles of slope in conformity to one another and selected in such a manner that the telescoping wedge bodies are clamped with one another in a self-locking manner. The selection of the angle of slope requires a balance between reliable self-locking action and minimum length dimension of the structure. When selecting the angle of slope too great, the deformation element would lose its load-carrying capability after a crash. On the other hand, when the angle of slope is too small, although self-locking action is ensured, this is realized at the expense of a compact deformation element as its length increases.

According to another feature of the present invention, the confronting surfaces of the wall portions of the neighboring wedge bodies may be formed, at least partially, with a surface structure which deforms as a result of friction when the wedge bodies move into one another. In this way, self-locking is improved. Application of casting technology produces substantial surface roughness that plays a factor when selecting an optimum angle of slope, wall thickness, and dimensioning of the predetermined breaking webs so as to realize optimum energy absorption as a result of deformation and friction at predetermined length reduction within a predefined tolerance range. The term "surface roughness" is used in the description in a generic sense and involves not only surface roughness produced during casting but covers also additional formations such as, e.g., small ribs or webs which interlock to thereby ensure a clamping of telescoping wedge bodies. The surface may also have a geometry that produces a swirl, i.e. a rotation about the length axis of a wedge body. As a consequence of a mutual rotation, the wedge bodies are prevented from pulling apart in a rectilinear movement and thus are held securely upon one another.

To retain the load-bearing capability, the wedge bodies have to maintain their integrity in the event of a crash. Only the predetermined breaking webs are intended to rupture and their stress resistance is selected to break before a predefined maximum tensile stress and pressure stress in circumferential direction has been reached in the wedge body. The predetermined breaking webs are thus configured to reliably rupture before a material break of the wedge bodies can occur. The stress resistance of the predetermined breaking webs may be further adjusted in a way that the predetermined breaking webs rupture successively and not simultaneously. When a predetermined breaking web ruptures, the previously connected wedge bodies move into one another telescopically up to a certain depth. This, by itself, results in an adaptable energy absorption. Upon reaching a maximum penetration depth, the next predetermined breaking web ruptures, and so forth until all predetermined breaking webs break and all wedge bodies abut one another. The maximum penetration depth may also be equated to a maximum force level.

Attachment of the deformation element to the metal castings can be realized by using adapter pieces which are configured to provide a transition between the geometry of the metal casting and the geometry of the wedge body. The adapter pieces may also be connected in one piece with the wedge bodies, on one hand, and the metal castings, on the other hand, by means of a casting process.

In view of the cascading disposition of the wedge bodies and the varying load level which each wedge body has to absorb or to transmit, it may be suitable to provide the wedge bodies of different wall thicknesses. Suitably, the wall thickness of the wedge body whose predetermined breaking web ruptures first is smaller than a wall thickness of the next following one of the wedge bodies. The wall thickness of each wedge body may be kept constant in length dimension of the wedge body or may expand from a narrow end to a wider end of the funnel shape. The increase in wall thickness towards the funnel-shaped expansion is currently preferred because the inside wall region of smaller diameter is compressed while the wall region of greater diameter is pushed from inside to the outside when telescoping. Neighboring wedge bodies are so dimensioned and adjusted to one another as to realize an adjustable energy absorption during telescoping as a result of plastic material elongation of the outer wall region and concomitant compression of the inner wall region as well as friction during telescoping, without experiencing material breakage of the walls.

According to another feature of the present invention, the wedge bodies may have successively increasing outer diameter, with the wedge body having a smallest outer diameter being the leading wedge body and with the remaining wedge bodies being positioned in succession in the order of increasing outer diameter. In this way, metal castings of widely varying dimensions can be connected together. Extreme diametrical fluctuations can be compensated through use of suitable adapter pieces between the deformation element and the metal castings.

Interaction between cone angle, wall thickness, stress resistance of the predetermined breaking webs, and surface structure plays an important role for the function of the deformation element. The cross section of the wedge bodies may widely differ. Currently preferred are wedge bodies having a geometry of a hollow truncated cone because this configuration is able to ensure a self-centering upon a common center length axis of the wedge bodies. Other examples of geometries for the wedge bodies include a hollow truncated pyramid, or a hollow truncated wedge. Also conceivable are wedge bodies having at least one guide surface extending in length direction, e.g. polygonal wedge bodies, such as star-shaped wedge bodies. Within certain limits, a mutual rotation of the wedge bodies, as they move into one another, can be prevented, or, when a helical geometry is involved, promoted in a desired manner.

According to another feature of the present invention, the deformation element may be made of aluminum or aluminum alloy. Of course, other appropriate cast material may be applicable as well.

Manufacture of the adaptive crash structure according to the invention can be facilitated by providing the deformation element with at least one opening on its circumference. This eliminates the need for application of a hollow casting process. The deformation element may therefore have an open cross section of different configuration.

A deformation element according to the invention may be used in addition to its incorporation in the front vehicle area also for adaptive crash purposes when structures or chassis parts in the rear vehicle area or rear section are involved.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
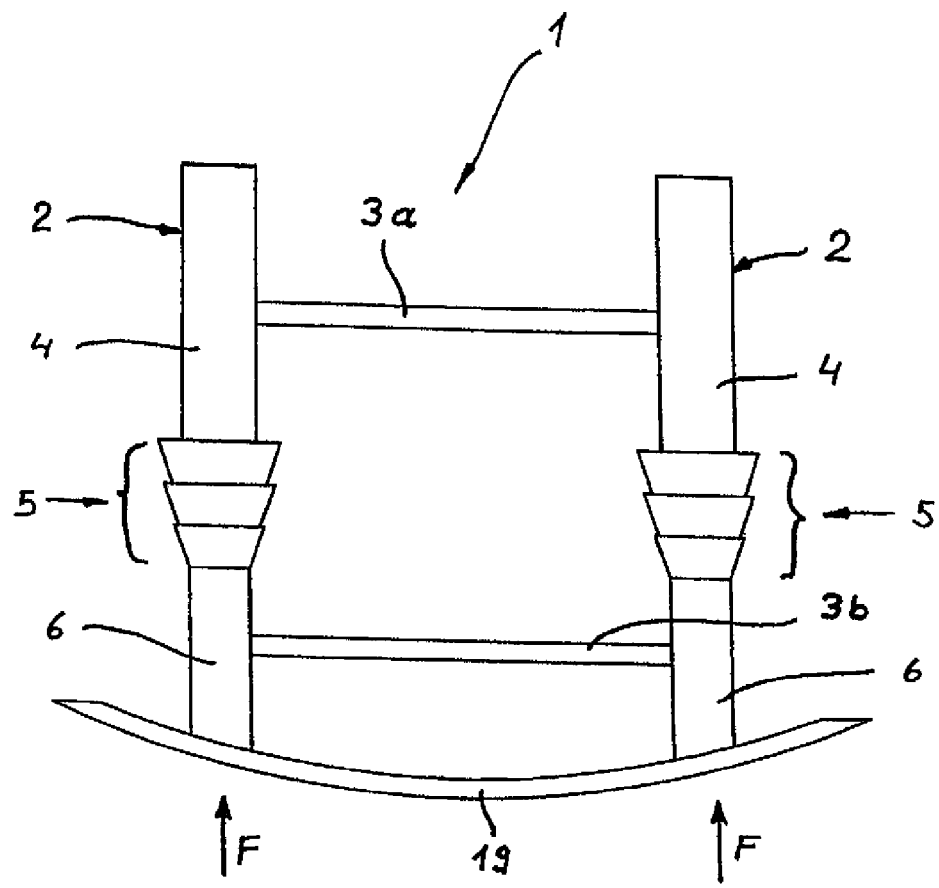
FIG. 1 is a simplified schematic plan view of a adaptive crash structure according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a simplified schematic plan view of an adaptive crash structure according to the present invention, generally designated by reference numeral 1, for use in a motor vehicle. The structure 1 includes two side parts 2 which extend in travel direction of the vehicle, and two crossbars 3a, 3b which extend transversely to the travel direction and interconnect the side parts 2. Each side part 2 has three regions: a first metal casting 4 for attachment of the crossbar 3a, a deformation element 5 in prolongation of the metal casting 4, and a second metal casting 6 for attachment of the crossbar 3b. The metal castings 4, 6 are shown here schematically only and should not be regarded as a limitation since their concrete configuration is not essential to this invention. A more important part of the present invention is the configuration of the deformation element 5.

The deformation element 5 assumes the task of absorbing forces introduced in a crash and to convert them into deformation work. The illustrated arrows F indicate the force attack direction, i.e. the force F is introduced via a bumper 19 into the front metal castings 6 and the deformation elements 5 which, in turn, are supported on the adjoining metal castings 4. In the exemplified embodiment shown in the drawing, each side part 2 of the structure 1 is completely made in one pour as metal casting. The need for jointing operations between the metal castings 4, 6 and the deformation element 5 is eliminated.

Figure 2:
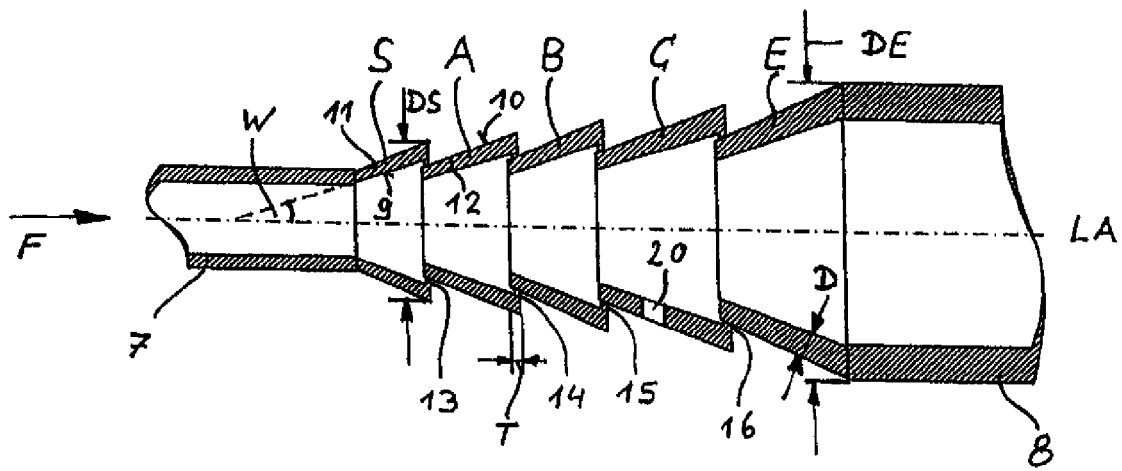
FIG. 2 is a longitudinal section of one embodiment of a deformation element for incorporation in the structure of FIG. 1.

FIG. 2 shows in greater detail a longitudinal section of one embodiment of the deformation element 5 for incorporation in the structure 1. In the exemplified embodiment, shown here, the deformation element 5 is comprised of five funnel-shaped wedge bodies S, A, B, C, E, whereby wedge body S represents the leading (start) wedge body and wedge body E represents the trailing (or last) stoppage wedge body. For sake of clarity, the term "leading" will denote a location closest with respect to the bumper 19, while the term "trailing" will denote a location furthest away from the bumper 19.

The leading wedge body S is connected in one piece with an adapter piece 7, and the trailing wedge body E is connected in one piece with an adapter piece 8. The adapter pieces 7, 8 have, by way of example, a tubular configuration of a diameter which conforms to the attachment diameters of the leading and trailing wedge bodies S, E, respectively. The diameter of the adapter piece 7, connected to the leading wedge body S, is smaller than the diameter DE of the adapter piece 8, connected to the trailing wedge body E. The adapter pieces 7, 8 as well as the in-between wedge bodies S, A, B, C, E extend on a common length axis LA.

As shown in FIG. 2, the wedge bodies S, A, B, C, E are defined by an outer diameter DS (only the outer diameter of the leading wedge S is labeled here by "DS", and the outer diameter DS of the trailing wedge body E corresponds to the outer diameter DE of the adapter piece 8), whereby the outer diameter DS increases from the leading wedge body S in the direction of the trailing wedge body E. In addition, all wedge bodies S, A, B, C, E have conforming angles of slope W so that confronting surfaces 9, 10 of contacting walls 11, 12 of the wedge bodies S, A, B, C, E rest flatly upon one another and are able to effect a tight intergrip in a self-locking manner, when the wedge bodies S, A, B, C, E move into one another in a telescopic manner. This action is assisted by providing the confronting surfaces 9, 10 of the wedge bodies S, A, B, C, E, at least partly, with a surface structure which deforms as a result of friction during telescoping of the wedge bodies S, A, B, C, E.

Each of the wedge bodies S, A, B, C, E is connected via a predetermined breaking web 13, 14, 15, 16, with the respectively next wedge body S, A, B, C, E. The predetermined breaking webs 13, 14, 15, 16 are arranged in this example at the wide end of the respective funnel-shaped wedge body S, A, B, C in the direction proximal to the trailing wedge body E and project into a radial plane inwards to connect, e.g., the wall 11 of the leading wedge body S with the wall 12 of the engaging adjacent wedge body A, and so forth. In other words, adjacent wedge bodies S, A, B, C, E are connected to one another via the predetermined breaking webs 13, 14, 15, 16. The penetration depth T of a wedge body A, B, C, E into the respectively adjacent wedge body S, A, B, C is sized enough to allow connection of the wedge bodies S, A, B, C, E via the interposed predetermined breaking webs 13, 14, 15, 16 and to ensure in addition a mutual guidance of the wedge bodies S, A, B, C, E, when a predetermined breaking web 13, 14, 15, 16 is crushed. Thus, the penetration depth T is only insignificantly greater than twice the width of a predetermined breaking web 13, 14, 15, 16.

As further shown in FIG. 2, each of the wedge bodies S, A, B, C, E has a wall thickness D which increases in the direction of the respectively successive wedge body A, B, C, E. In addition, the mean wall thickness of the individual wedge bodies S, A, B, C, E increases from the leading wedge body to the trailing wedge body E.

Figure 4:
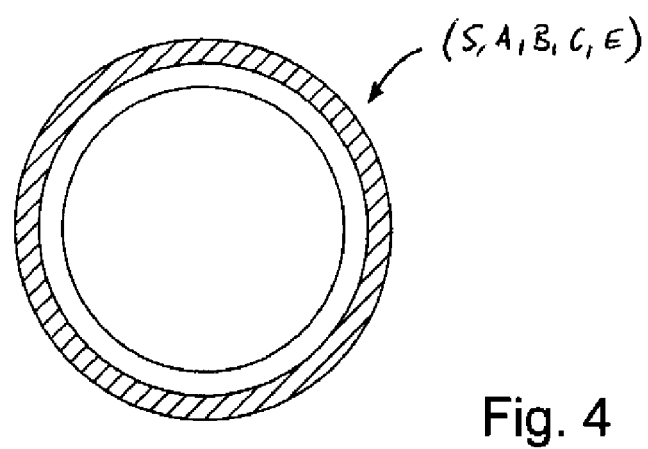
FIGS. 4-6 show schematic illustration of various shapes of a wedge body.
Figure 5:
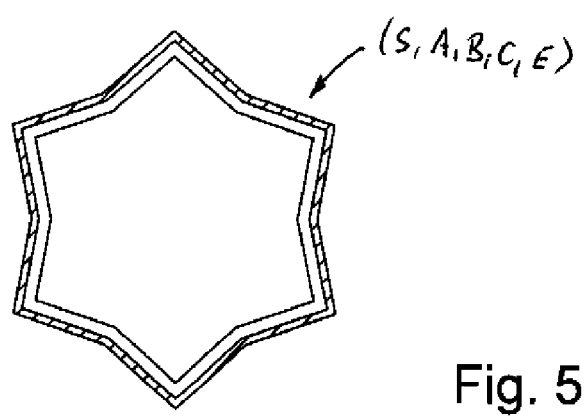
Figure 6:
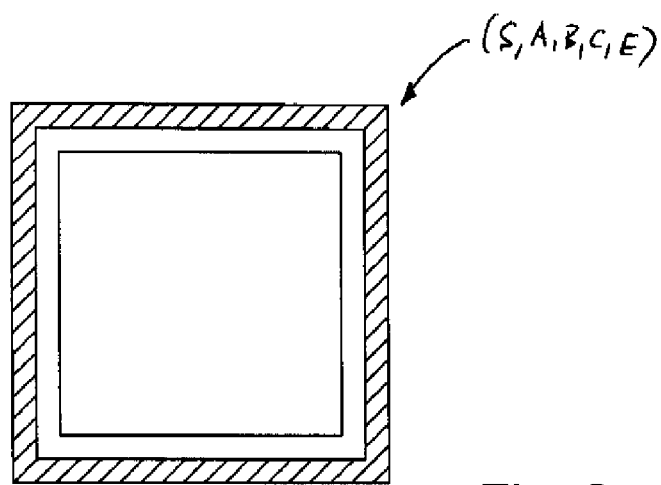

As shown in FIGS. 4 to 6, the wedge bodies S, A, B, C, E may be configured of any suitable cross section. FIG. 4 shows by way of example a circular configuration, whereas FIG. 5 shows a star-shaped configuration, and FIG. 6 shows a polygonal, in particular a tetragonal, configuration. As indicated by way of example in FIG. 2, the deformation element 5 may be provided with at least one opening 20 on a circumference of one of the wedge bodies S, A, B, C, E (here wedge body E).

Figure 3:
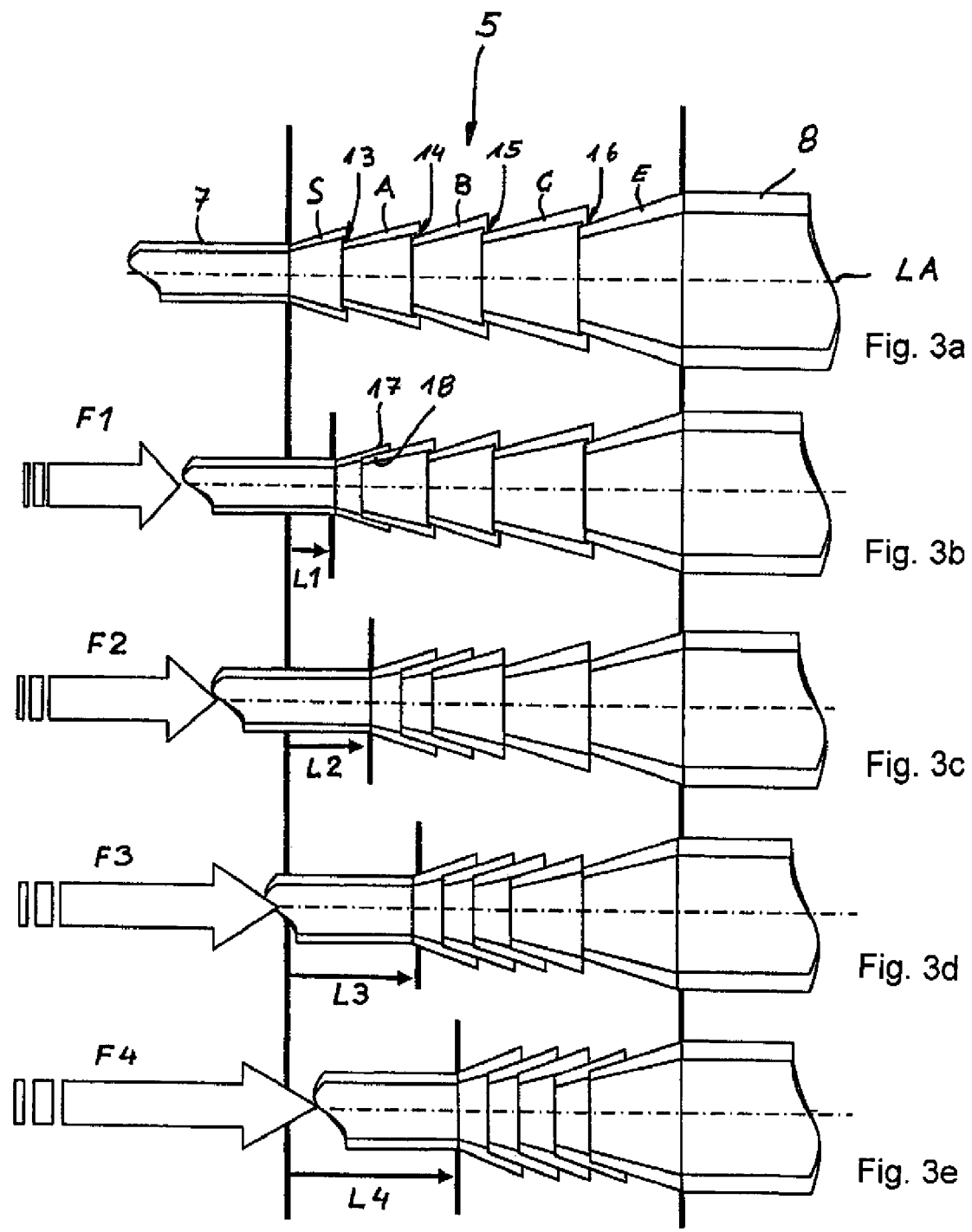
FIGS. 3a-3e are schematic illustrations of sequential operational stages as the deformation element undergoes a telescoping movement in the event of a crash.

The mode of operation of the deformation element 5 will now be described with reference to FIGS. 3a-3e, showing five individual phases to illustrate the chronological sequence in the event of a crash. FIG. 3a corresponds to the illustration of FIG. 2 and shows the initial state before a force F is introduced as a result of an impact. When a certain force level has been exceeded, as indicated in FIG. 3b by arrow F1, the predetermined breaking web 13 between the leading wedge body S and the adjacent wedge body A is crushed so that the leading wedge body S is pushed over the adjacent wedge body A. As a result, the wedge bodies S, A are wedged together. At the same time, energy is dissipated as a consequence of the rupture of the predetermined breaking web 13 and friction between the wedge bodies S, A. As the leading wedge body S is pushed over the adjacent wedge body A, the outer wall portion 17 of the leading wedge body S expands whereas the inner wall portion 18, which is surrounded by the outer wall portion 17, is concomitantly compressed. The wall portions 17, 18 are hereby pressed into one another in such a manner that the wedge bodies S, A are guided securely in relation to one another and a desired length reduction about a distance L1 is realized. In other words, the deformation element 5 yields to a limited degree up to a certain force level.

When the applied force exceeds a higher predefined force level, as indicated by arrow F2 in FIG. 3c, the next predetermined breaking web 14, which connects the wedge body A with the following wedge body B, is crushed. As a result, the deformation element 5 is shortened by the distance L2. Additional energy is absorbed as a result of the rupture of the predetermined breaking web 14, and the friction between the wedge bodies A, B, and the expansion of the compressed wedge bodies A, B.

FIG. 3d shows the state in which a still greater force F3 is applied, resulting in a shortening of the deformation element 5 by a distance L3, and FIG. 3e shows the state in which a still greater force F4 is applied, resulting in a shortening of the deformation element 5 by a distance L4, while energy is increasingly absorbed. FIG. 3e shows the maximum compression of the deformation element 5.

An adaptive crash structure 1 according to the invention with integrated deformation element allows absorption of a certain energy amount as a consequence of deformation, friction and sequential destruction of the predetermined breaking webs 13, 14, 15, 16. The structure 1 is easy to produce by a casting process and is resilient to impact despite the relatively low ductility whereby all casting parts are solidly connected to one another at the same time.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. An adaptive crash structure of a vehicle body or chassis of a motor vehicle, comprising:
   a first metal casting;
   a second metal casting; and
   a deformation element in the form of a metal casting for absorbing energy, said deformation element interconnecting and formed in one piece with the first and second metal castings through a casting process, wherein the deformation element is comprised of a plurality of funnel-shaped wedge bodies disposed in succession, with neighboring wedge bodies being connected through intervention of a predetermined breaking web, wherein each wedge body is defined by a diameter, with the diameters of the wedge bodies sized to allow the wedge bodies to move telescopically into one another when a limit stress is reached and the predetermined breaking webs are crushed so as to effect a tight intergrip of the telescoping wedge bodies in a self-locking manner.

2. The structure of claim 1, wherein the deformation element is disposed in a length direction of the vehicle.

3. The structure of claim 1, wherein the deformation element is disposed at an angle to a length direction of the vehicle.

4. The structure of claim 3, wherein the angle ranges between 45° and 135°.

5. The structure of claim 3, wherein the angle is 90°.

6. The structure of claim 1, wherein neighboring wedge bodies have wall portions to come into contact with confronting surfaces which are defined by angles of slope in conformity to one another and selected in such a manner that the telescoping wedge bodies are clamped with one another in a self-locking manner.

7. The structure of claim 6, wherein the confronting surfaces of the wall portions of the neighboring wedge bodies are formed, at least partially, with a surface structure which deforms as a result of friction when the wedge bodies move into one another.

8. The structure of claim 7, wherein the surface structure is configured such that telescoping wedge bodies are clamped together.

9. The structure of claim 1, wherein the predetermined breaking webs are constructed to rupture before a maximum tensile stress or pressure stress in circumferential direction has been reached in the wedge body.

10. The structure of claim 1, wherein the predetermined breaking webs have a stress resistance selected to effect a successive rupture of the predetermined breaking webs.

11. The structure of claim 1, wherein the succession of wedge bodies defines a leading wedge body and a trailing wedge body, and further comprising a first adapter piece for connecting the leading wedge body with one of the first and second metal castings, and a second adapter piece for connecting the trailing wedge body with the other one of the first and second metal castings.

12. The structure of claim 11, wherein the first and second adapter pieces are connected in one piece with the deformation element and the first and second metal castings, respectively, by means of a casting process.

13. The structure of claim 1, wherein the wedge bodies have different wall thicknesses.

14. The structure of claim 1, wherein the succession of wedge bodies defines a leading wedge body which has a wall thickness which is smaller than a wall thickness of a following one of the wedge bodies.

15. The structure of claim 13, wherein the wall thickness of each wedge body is constant in a length dimension of the wedge body.

16. The structure of claim 1, wherein each of the funnel-shaped wedge bodies expands from a narrow end to a wider end and has a wall thickness which increases in size in a direction of the wider end.

17. The structure of claim 1, wherein the wedge bodies have successively increasing outer diameter, with the wedge body having a smallest outer diameter being the leading wedge body and with the remaining wedge bodies being positioned in succession in the order of increasing outer diameter.

18. The structure of claim 1, wherein the wedge bodies have a geometry of a hollow truncated cone.

19. The structure of claim 1, wherein the wedge bodies have a geometry of a hollow truncated pyramid.

20. The structure of claim 1, wherein the wedge bodies have a geometry of a hollow truncated wedge.

21. The structure of claim 1, wherein the wedge bodies have a polygonal configuration.

22. The structure of claim 1, wherein the wedge bodies have a star-shaped configuration.

23. The structure of claim 1, wherein the first and second metal castings and the deformation element are made of aluminum alloy.

24. The structure of claim 1, wherein the deformation element has a circumference formed with at least one opening.

* * * * *